United States Patent
Foss

(10) Patent No.: US 6,311,008 B1
(45) Date of Patent: Oct. 30, 2001

(54) OPTICAL FIBER STORAGE APPARATUS

(76) Inventor: Raymond Charles Foss, 152 Peverell Park Road, Peverell, Plymouth PL3 4NX (GB)

(*) Notice: Subject to any disclaimer, the term of this patent is extended or adjusted under 35 U.S.C. 154(b) by 0 days.

(21) Appl. No.: 09/427,469

(22) Filed: Oct. 26, 1999

(30) Foreign Application Priority Data

Oct. 29, 1998 (GB) .................................................. 9823701

(51) Int. Cl.$^7$ .................................................. G02B 6/46
(52) U.S. Cl. .................................................. 385/135; 385/134
(58) Field of Search .................................................. 385/134–137

(56) References Cited

U.S. PATENT DOCUMENTS

| | | | |
|---|---|---|---|
| 4,911,521 | * 3/1990 | Ryuto et al. .................. | 385/135 |
| 5,131,066 | * 7/1992 | Foss .................. | 385/135 |
| 5,155,794 | * 10/1992 | Nolf et al. .................. | 385/135 |
| 5,204,933 | * 4/1993 | Marx .................. | 385/53 |
| 5,553,186 | * 9/1996 | Allen .................. | 385/135 |
| 5,619,608 | * 4/1997 | Foss et al. .................. | 385/135 |
| 5,751,882 | * 5/1998 | Daems et al. .................. | 385/135 |
| 5,946,440 | * 8/1999 | Puetz .................. | 385/135 |
| 6,009,224 | * 12/1999 | Allen .................. | 385/135 |
| 6,061,492 | * 5/2000 | Strause et al. .................. | 385/135 |
| 6,081,644 | * 6/2000 | Stateczny et al. .................. | 385/135 |

* cited by examiner

Primary Examiner—Phan T. H. Palmer
Assistant Examiner—Michelle R. Connelly-Cushwa
(74) Attorney, Agent, or Firm—Vedder Price Kaufman & Kammholz

(57) ABSTRACT

An optical fiber storage apparatus comprises a base formed with one or more ports for the entry of cables, supports for mounting a plurality of fiber storage trays on the base, arranged as three stacks having respective axes spaced at successive intervals around in a circle, at least one of the stacks of trays being able to pivot sidewards about a horizontal axis to afford access or increased access to a central space around which the three stacks are positioned.

15 Claims, 3 Drawing Sheets

OPTICAL FIBER STORAGE APPARATUS

BACKGROUND OF THE INVENTION

The present invention relates generally to an apparatus or enclosure for storing optical fibers and splices between optical fibers, in an optical fiber cable network.

It is known to provide optical fiber storage apparatus in the form of an enclosure which houses two stacks of storage trays, the two stacks being mounted back-to-back with space between them to accommodate the fibers running to the individual trays.

We have now devised a fiber storage apparatus which is able to enclose a larger number of storage trays whilst still affording a good degree of access to the cables and fibers leading to the individual trays.

SUMMARY OF THE INVENTION

In accordance with the present invention, there is provided an optical fiber storage apparatus which comprises a base formed with one or more ports for the entry of cables, means for mounting a plurality of fiber storage trays on the base, arranged as three stacks having respective axes spaced at successive intervals around in a circle, at least part of at least one of the stacks of trays being able to move sidewards to afford access or increased access to a central space around which the three stacks are positioned.

In particular, at least one part of at least one stack may be arranged to swivel around on its axis to afford access or increased access to the central space behind the stacks of trays.

Preferably, each of the three stacks of trays is arranged that at least part of it can swivel on its axis. Thus, the trays in any two stacks can be swivelled away from each other to afford access, or increased access, to the central space behind the stacks of trays. The central space may be used to accommodate cables or fibers leading to the individual trays.

Preferably, the trays of each stack are mounted so as to project radially outwardly, with respect to a longitudinal axis of the central space of the apparatus, from the respective swivel axis of the stack. Preferably, the trays of each stack are further mounted for individual pivoting about respective axes transverse to the swivel axis of the stack. Preferably, the trays are normally inclined downwardly towards the base but can be pivoted upwardly to gain access to any selected tray.

Preferably, at least part of at least one of the stacks can be pivoted radially outwardly and downwardly. This movement also affords increased access to the central space behind the stacks of trays and also to any selected individual tray.

In accordance with a second aspect of the present invention, there is provided an optical fiber storage apparatus which comprises an end portion formed with one or more ports for the entry of cables, means for mounting a plurality of fiber storage trays on the end portion, arranged as one or more stacks, at least part of the stack or at least one of the stacks being arranged for pivoting from a first position to a second position disposed outwardly of the axis of the stack and towards said end portion.

Preferably, the or each stack of trays comprises an elongate support which extends axially of the stack and which is pivoted at one end to said end portion.

In use, the apparatus can be mounted at any angle and thus means may be provided for locking the stack or stack portion in said second position, in order to prevent the stack from hinging back under gravity whilst work is being carried out inside the apparatus.

Also, means may also be provided for locking the stack or stack portion in said first position.

In one embodiment, the or each stack of trays are mounted inside a tubular cover which is closed at one end, the opposite end of the cover being engaged with said end portion which defines a base through which cables enter the apparatus, at least part of the stack or at least one of the stacks being arranged for pivoting outwardly and downwardly relative to the base.

In an alternative embodiment for mounting in-line with one or more cables, the apparatus comprises opposed first and second end portions each formed with one or more ports for the entry of cables, at least part of the stack or at least one of the stacks being arranged for pivoting outwardly of the axis of the stack towards a said end portion.

Preferably a cover fits between said opposed end portions.

Preferably the cover is tubular and is preferably split in two halves along the axis thereof.

These and other objects, features and advantages of the present invention will be clearly understood through consideration of the following detailed description.

BRIEF DESCRIPTION OF THE DRAWINGS

In the course of the following detailed description reference will be frequently made to the accompanying drawings in which.

DETAILED DESCRIPTION OF THE INVENTION

Figure 1:
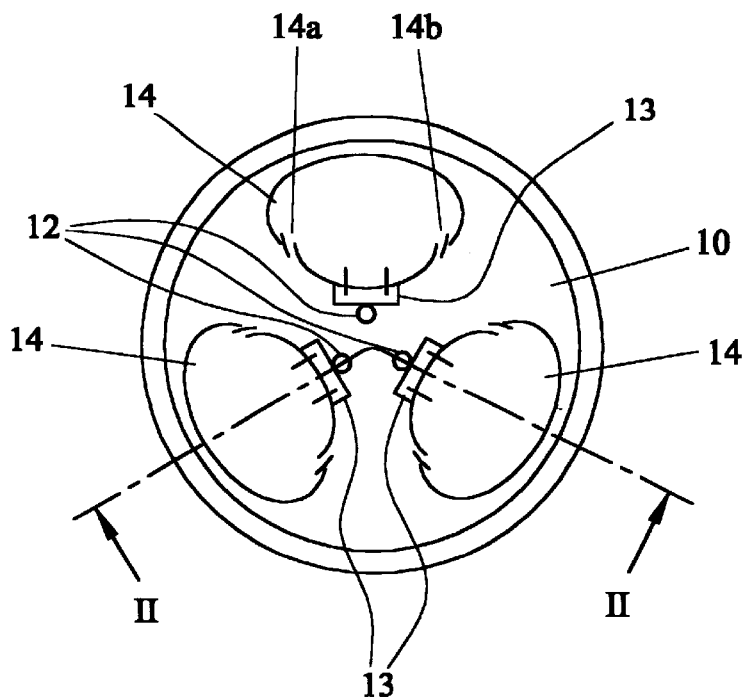
FIG. 1 is a schematic plan view of an embodiment of optical fiber storage apparatus in accordance with the present invention, shown with its cover removed.
Figure 2:
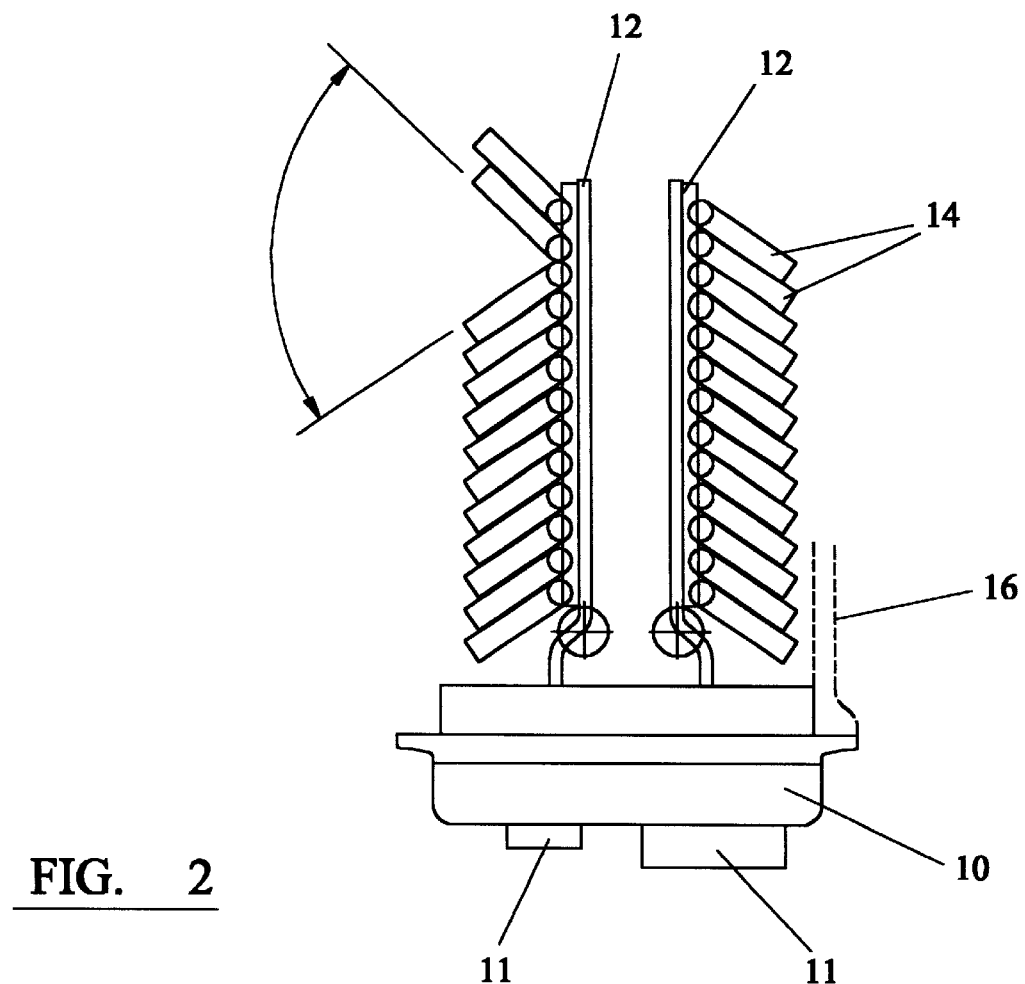
FIG. 2 is a sectional view of the storage apparatus, taken on the line II—II indicated in FIG. 1.

Referring to FIGS. 1 and 2 of the drawings, there is shown an embodiment of optical fiber storage apparatus which comprises a generally circular base 10 formed with a number of tubular cable entry ports 11 projecting from its underside. Three upright supports 12 are mounted to the base 10 at positions spaced at 120° intervals around in a circle: the supports 12 project upwardly from the base, generally parallel to its axis. 24 trays 14 are mounted to each support 12, each tray being coupled to its support 12 via an intermediate member 13.

The set of 24 trays are stacked one-upon-another, normally to incline downwardly and radially outwardly from the respective upright support 12. Each tray is pivoted to the intermediate member 13 for pivoting about a horizontal axis: the intermediate member 13 is mounted to the upright support 12 for swivelling around the latter. Each tray 14 is generally oval in plan view, disposed with its minor axis extending radially outwardly with respect to the axis of the base 10. The storage apparatus is provided with a cylindrical casing, indicating at 16, which is open at one end and closed at its opposite, thus forming a cover which can be fitted over the three stacks of trays and fitted onto the base 10.

The apparatus is arranged so that optical fiber cables may enter the closure through one or more of the ports 11 of the base 10: the cables or fibers from these cables can be accommodated in the central space radially inwardly of the three upright supports 12 and their stacks of trays, the fibers running to the individual trays 14 via entry ports e.g. 14a, 14b formed at the radially-inner edges of the trays. With 24 trays in each of the three stacks, there is a total of 72 trays: the apparatus can therefore accommodate a total of 144 fibers, two fibers in each tray.

Referring to FIG. 2, it will be noted that when access to any particular tray is required, the trays above that tray, in the same stack, are pivoted upwardly about their respective pivotal couplings to their upright support. The engineer can then work on the required tray, to insert a coil of fibers or to insert a fiber splice into that tray.

Figure 3:
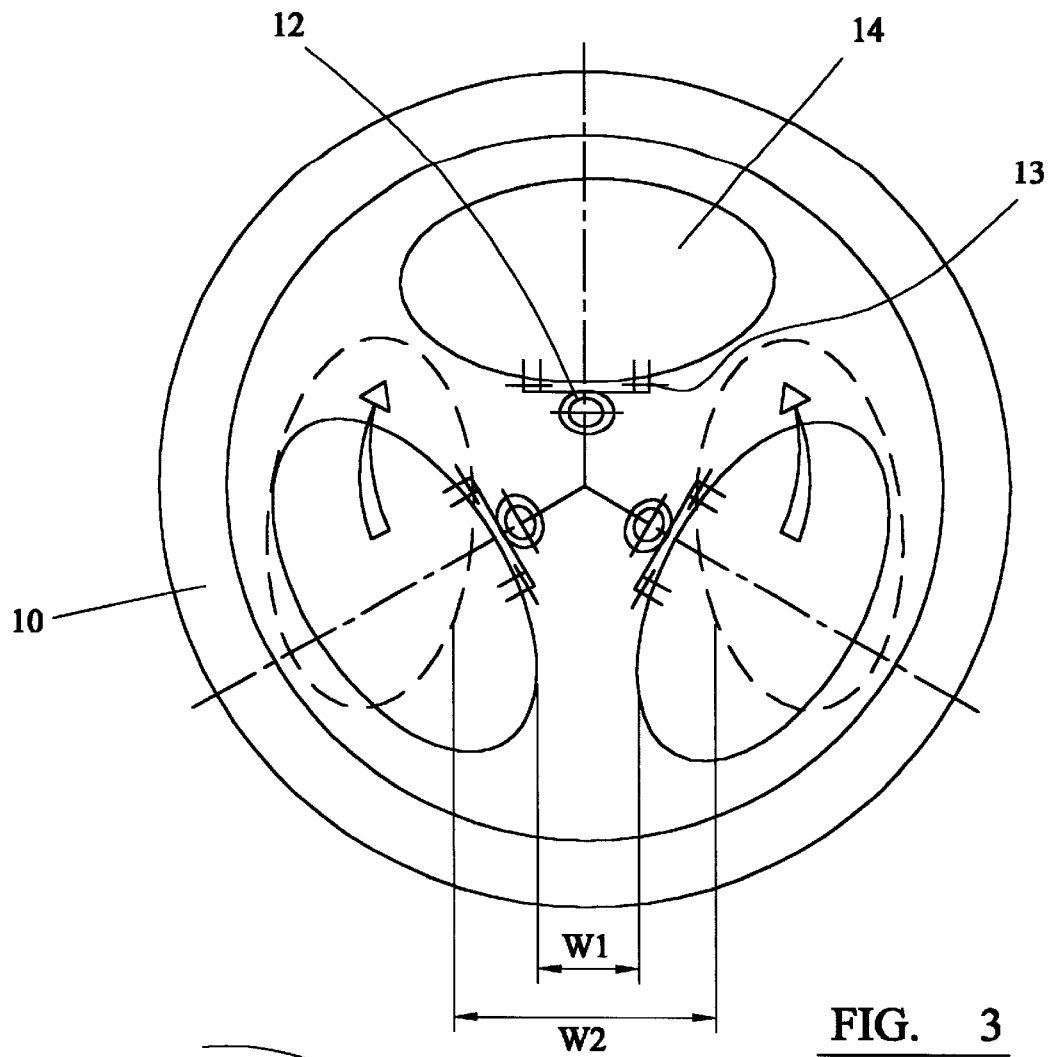
FIG. 3 is an enlarged schematic plan view of the storage apparatus, to show the manner in which each adjacent pair of stacks of trays can be swivelled apart.

Referring to FIG. 3, when access is required to a cable or fibers in the central space radially inwardly of the three upright supports 12, and to the fiber entry ports of the individual trays, then an adjacent pair of stacks of trays can be swivelled apart around their respective upright supports 12: the access is effectively increased from a width W1 to a width W2 as shown in FIG. 3.

Figure 4:
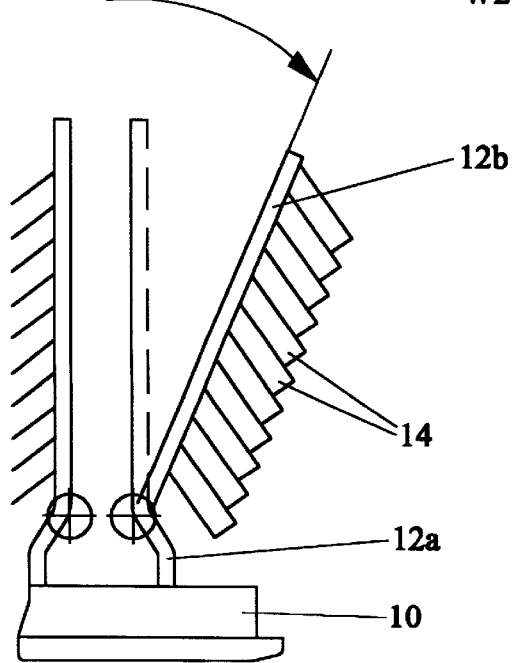
FIG. 4 is a schematic sectional view, corresponding to FIG. 2, showing the manner in which each stack of trays can be pivoted outwardly.

Referring to FIG. 4, each upright support 12 has a short, lower portion 12a projecting upwardly from the base 10, and an elongate upper portion 12b the lower end of which is pivotally mounted to the top of the lower portion 12a. This enables the portion 12b of the support, together with the entire stack of trays 14, to be pivoted radially outwards, giving a greater access to the trays themselves and to the cables and fibers behind them.

Figure 5:
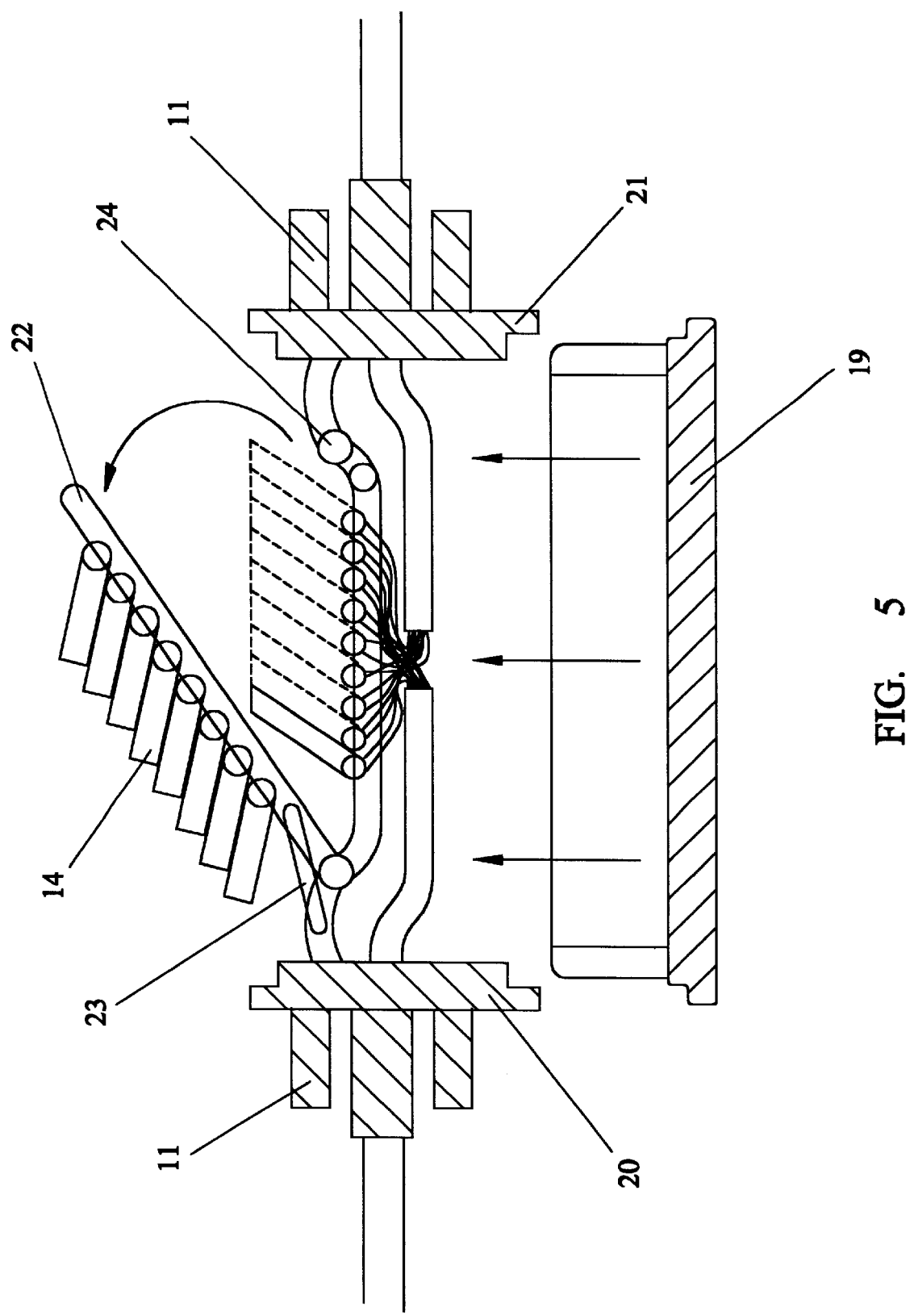
FIG. 5 is a schematic longitudinal sectional view of an alternative embodiment of optical fiber storage apparatus in accordance with the present invention, shown with its cover removed.

Referring to FIG. 5 of the drawings, there is shown an alternative embodiment of optical fiber storage apparatus which comprises an elongate tubular cover 19, which is closed at its opposite ends by opposed generally circular end portions 20,21, each formed with a number of tubular cable entry ports 11 projecting axially of the cover 19. An elongate support 22 is mounted at one end to one of the end portions 21: the support 22 extends axially of the cover, generally parallel to its axis. 24 trays 14 are mounted to the support 22, each tray being coupled to the support 22 via an intermediate member (not shown).

The set of 24 trays are stacked one-upon-another along the longitudinal axis of the apparatus, normally to incline radially outwardly from the support 22 towards the end portion 21. Each tray 14 is pivoted to the intermediate member for pivoting about an axis which extends perpendicular to the longitudinal axis of the apparatus: the intermediate member is mounted to the upright support 22 for swivelling around the latter. Each tray 14 is generally oval in plan view, disposed with its minor axis extending radially outwardly with respect to the longitudinal axis of the apparatus. The tubular cover 19 is split longitudinally into two halves, thus forming a cover which can be fitted around the stack of trays between the opposed end portions 20, 21.

The apparatus is arranged so that optical fiber cables may enter and/or leave the closure through one or more of the ports 11 of the opposed end portions 20,21: the cables or fibers from these cables can be accommodated along the length of the apparatus, the fibers running to the individual trays 14 via entry ports (not shown) formed at the radially-inner edges of the trays.

In order to increase the capacity of the apparatus, a plurality of stacks of trays may be mounted side-by-side. For example, with three stacks of 24 trays, there would be a total of 72 trays: such an apparatus can therefore accommodate a total of 144 fibers, two fibers in each tray.

When access to any particular tray is required, the trays above that tray, in the same stack, are pivoted apart about their respective pivotal couplings to the support 22. The engineer can then work on the required tray, to insert a coil of fibers or to insert a fiber splice into that tray.

When access is required to a cable or fibers running through the apparatus, and to the fiber entry ports of the individual trays, then the support, together with the entire stack of trays 14, can be pivoted radially outwards, giving a greater access to the trays themselves and to the cables and fibers running through the apparatus.

A locking catch 23 is provided for locking the stack in its pivoted position, thereby enabling an engineer to work on the cover with both hand, regardless of the orientation of the stack. Another locking catch 24 is provided for locking the stack in its normal stored position, so that the stack cannot move or dislodge once the cover 19 is fitted.

While the preferred embodiment of the invention have been shown and described, it will be apparent to those skilled in the art that changes and modifications may be made therein without departing from the spirit of the invention, the scope of which is defined by the appended claims.

What is claimed is:

1. An optical fiber storage apparatus which comprises a base formed with one or more ports for the entry of cables, means for mounting a plurality of fiber storage trays on the base, arranged as three stacks having respective axes spaced at successive intervals around in a circle, at least part of at least one of the stacks of trays being able to move sidewards to afford access or increased access to a central space around which the three stacks are positioned.

2. An optical fiber storage apparatus as claimed in claim 1, in which at least one part of at least one stack may be arranged to swivel around on its axis to afford access or increased access to the central space behind the stacks of trays.

3. An optical fiber storage apparatus as claimed in claim 2, in which each of the three stacks of trays is arranged that at least part of it can swivel on its axis.

4. An optical fiber storage apparatus as claimed in claim 2, in which the trays of each stack are mounted so as to project radially outwardly, with respect to a longitudinal axis of the central space of the apparatus, from the respective swivel axis of the stack.

5. An optical fiber storage apparatus as claimed in claim 2, in which the trays of each stack are mounted for individual pivoting about respective axes transverse to the swivel axis of the stack.

6. An optical fiber storage apparatus as claimed in claim 5, in which the trays are normally inclined downwardly towards the base but can be pivoted upwardly to gain access to any selected tray.

7. An optical fiber storage apparatus as claimed in claim 1, in which at least part of at least one of the stacks can be pivoted radially outwardly and downwardly.

8. An optical fiber storage apparatus which comprises an end portion formed with one or more ports for the entry of cables, means for mounting a plurality of fiber storage trays on the end portion, arranged as a plurality of stacks, at least one of the stacks being arranged for pivoting from a first position to a second position disposed outwardly of the axis of the stack and towards said end portion.

9. An optical fiber storage apparatus as claimed in claim 8, in which the or each stack of trays comprises an elongate support which extends axially of the stack and which is pivoted at one end relative to said end portion.

10. An optical fiber storage apparatus as claimed in claim 8, comprising means for locking the stack or stack portion in said second position.

11. An optical fiber storage apparatus as claimed in claim 8, comprising means for locking the stack or stack portion in said first position.

12. An optical fiber storage apparatus as claimed in claim 8, in which the or each stack of trays are mounted inside a tubular cover which is closed at one end, the opposite end of the cover being engaged with said end portion which defines a base through which cables enter the apparatus, at least part of the stack or at least one of the stacks being arranged for pivoting outwardly and downwardly relative to the base.

13. An optical fiber storage apparatus as claimed in claim 8, comprising opposed first and second end portions each formed with one or more ports for the entry of cables, at least part of the stack or at least one of the stacks being arranged for pivoting outwardly of the axis of the stack towards a said end portion.

14. An optical fiber storage apparatus as claimed in claim 13, in which a cover fits between said opposed end portions.

15. An optical fiber storage apparatus as claimed in claim 14, in which the cover is tubular and is split in two halves along the axis thereof.

* * * * *